July 11, 1967
P. BARAN ET AL
3,330,368
PERISTALTIC GOPHER
Filed June 7, 1965
5 Sheets-Sheet 1
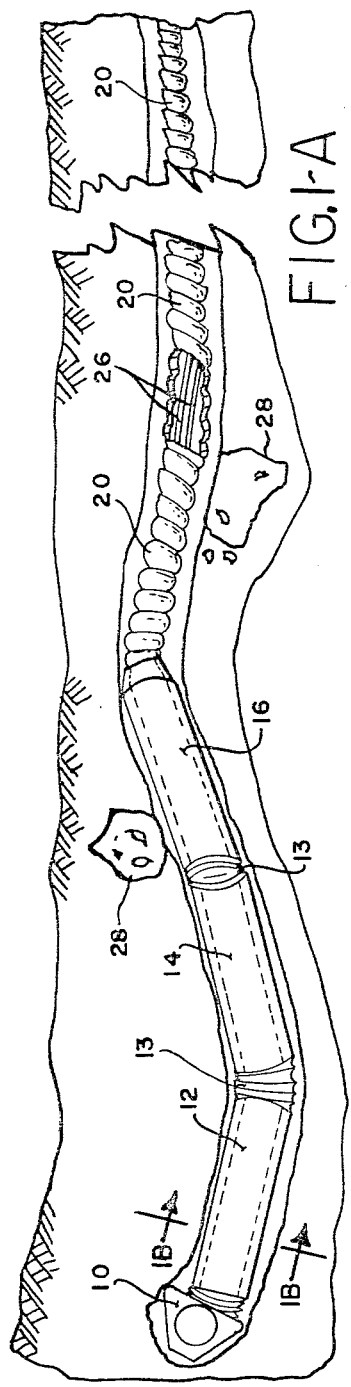
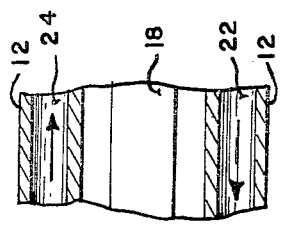
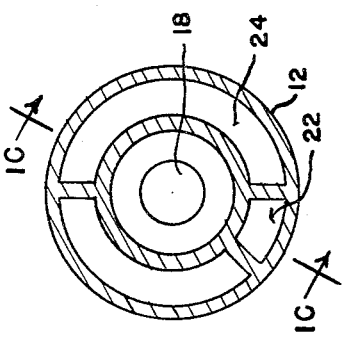
INVENTORS.
PAUL BARAN AND
SAMUEL GENENSKY
BY Harry A. Herbert Jr.
Ruth J. Cohen
ATTORNEYS July 11, 1967     P. BARAN ET AL     3,330,368
PERISTALTIC GOPHER
Filed June 7, 1965     5 Sheets-Sheet 2
FIG.2-A     FIG.2-B
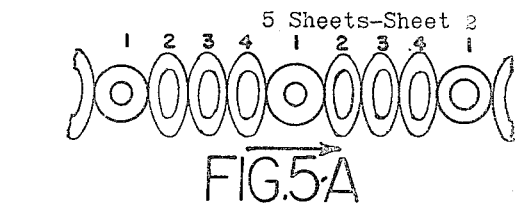
FIG.5-A
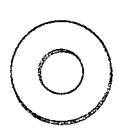
FIG.3-A     FIG.3-B
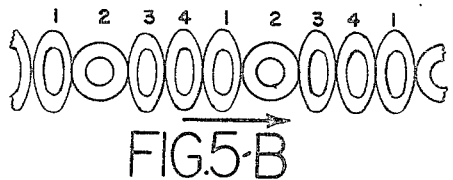
FIG.5-B
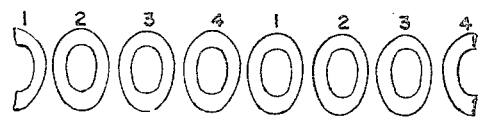
FIG.4
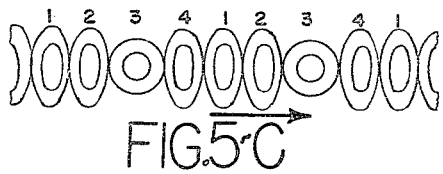
FIG.5-C
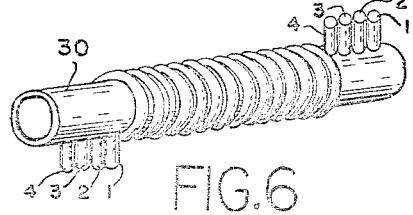
FIG.6
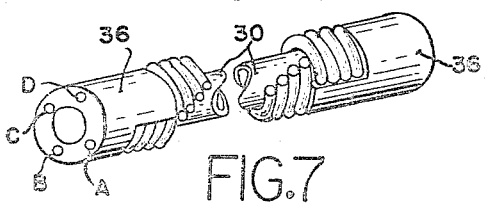
FIG.7
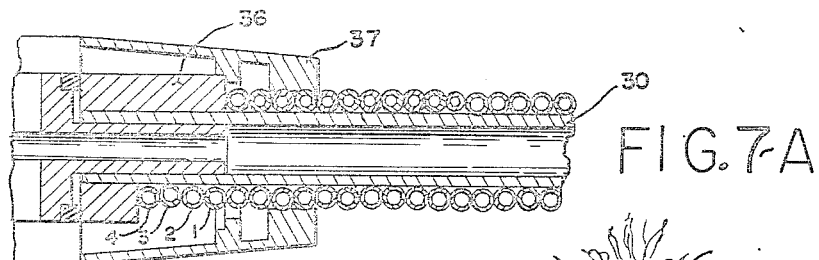
FIG.7-A
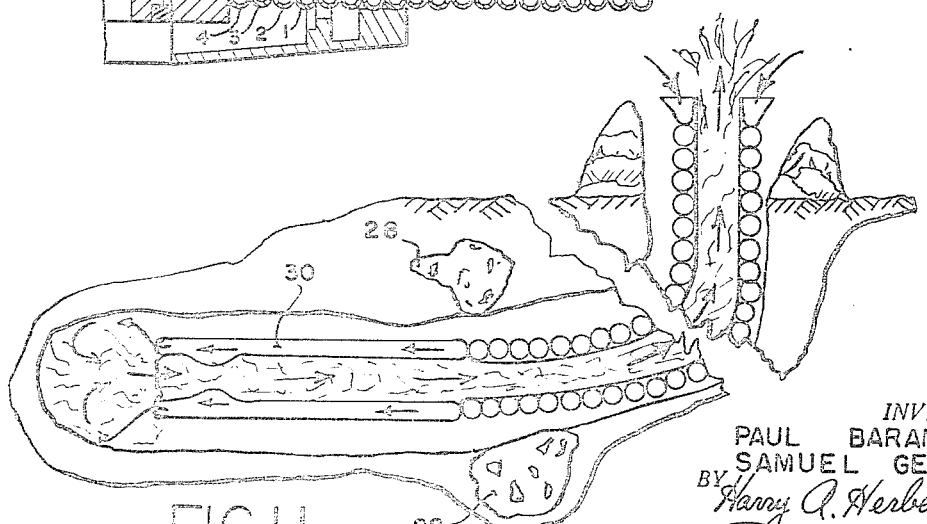
FIG.11
*INVENTORS.*
*PAUL BARAN AND*
*SAMUEL GENENSKY*
BY *Harry A. Herbert Jr.* and
*ATTORNEYS*

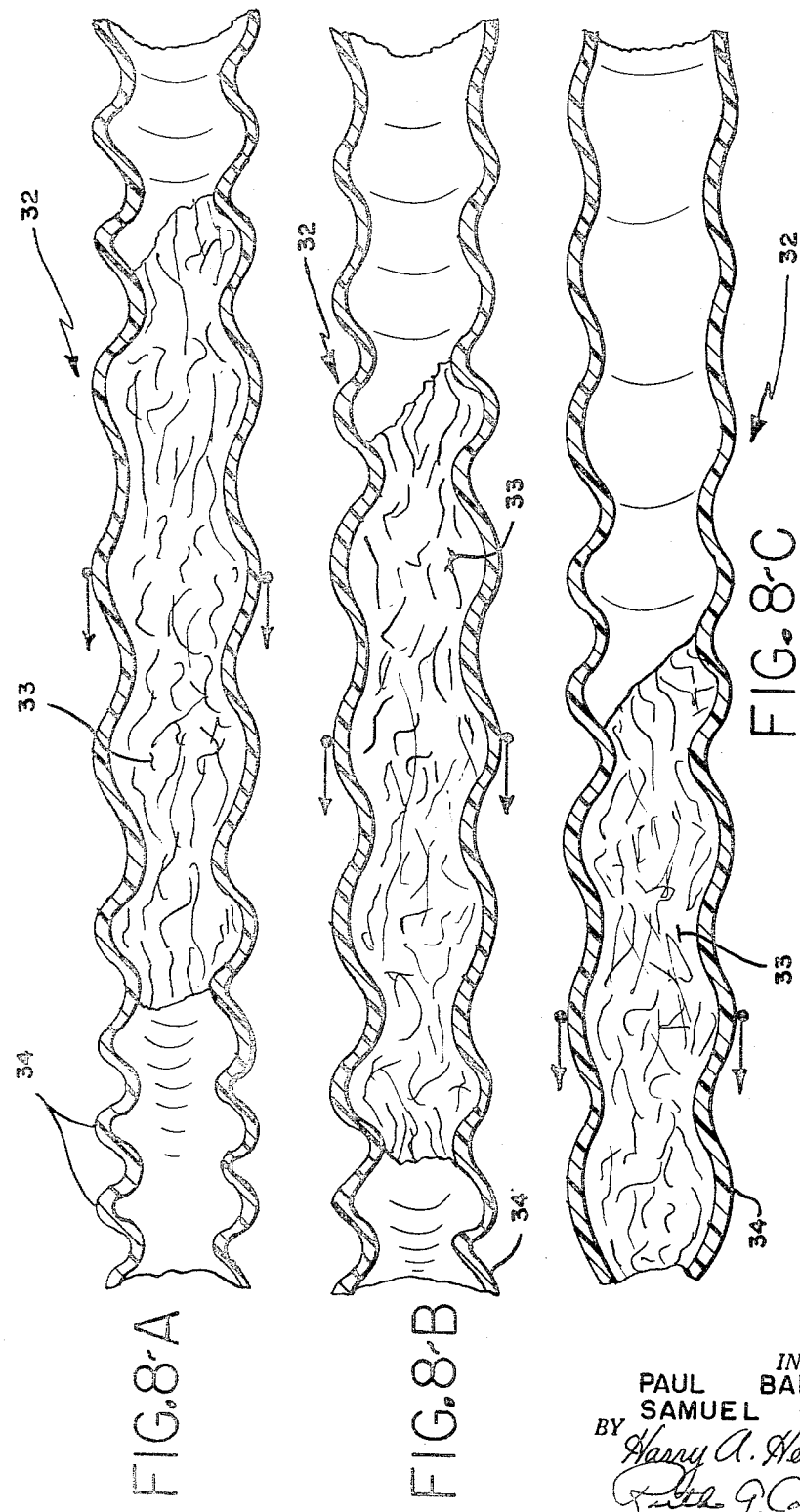

July 11, 1967 P. BARAN ET AL 3,330,368
PERISTALTIC GOPHER
Filed June 7, 1965 5 Sheets-Sheet 4
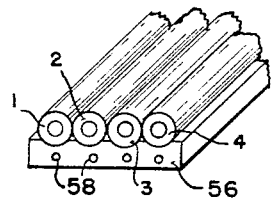
FIG.12-A
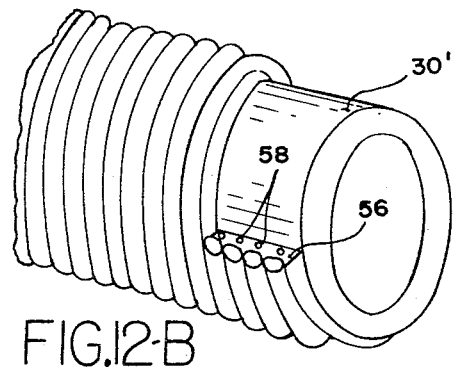
FIG.12-B
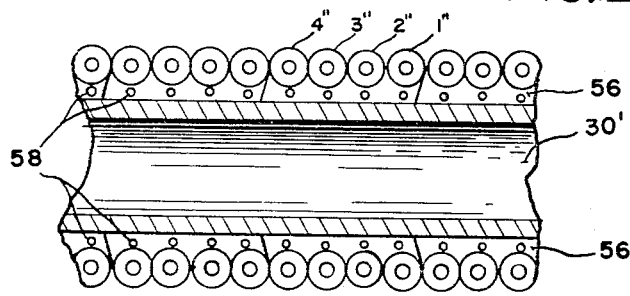
FIG.12-C
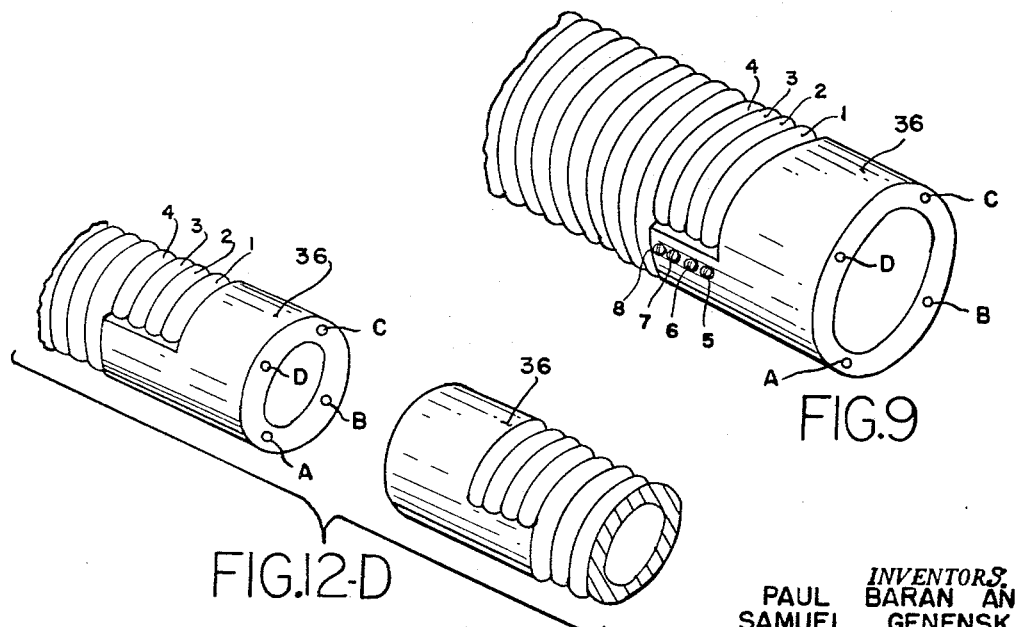
FIG.12-D
FIG.9
INVENTORS
PAUL BARAN AND
SAMUEL GENENSKY
BY Harry A. Herbert Jr and
Ruth J. Coles
ATTORNEYS

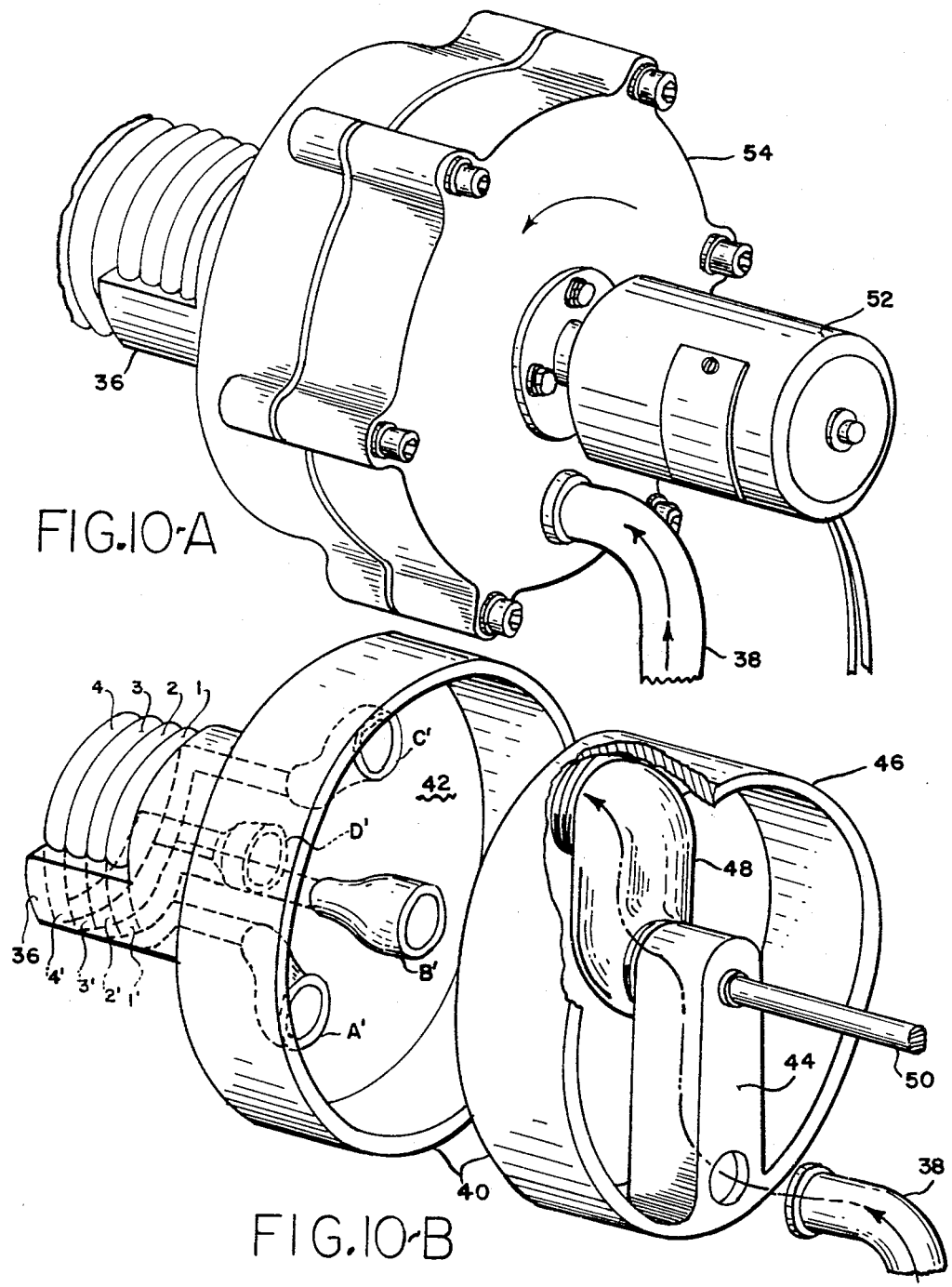

ABSTRACT OF THE DISCLOSURE

A drill head capable of drilling longitudinal holes underground drags after it a cable to be laid and is impelled forward by peristaltic motion induced in a long plastic tube surrounding the cable. The motion is accomplished by pumping water rhythmically through chosen ones of a series of thin walled small tubes wound in a parallel around the plastic tube, to produce relaxing and contraction resembling rhythmic and progressing peristaltic motion. The water thus pumped may be used as drilling fluid and is returned through the tube with accumulated drillings.

---

The invention relates to improvements in drilling and boring techniques, and more particularly to a method and a device which affects and utilizes a peristaltic motion in a flexible tube for deep underground laying of cable.

Specifically, this invention describes a method of producing long holes through the ground at low cost for conveying electrical cable communications circuits, power lines, water, petroleum or any other service that requires the use of a subsurface conduit and/or pipe. At present, adequate techniques exist for plowing in small diameter conduit in shallow depths of earth. Means also exist for economically trenching and backfilling trenches on the order of six to ten feet in depth. However, when it is necessary to provide small diameter holes through the earth at much greater depth, only very expensive tunnelling methods are currently available. Such methods are so expensive as to preclude the use of small diameter conduits and/or pipe in many cases where they would be otherwise advantageous. For example, military communications circuits could be made to be more immune from the deleterious effects of weapons, including thermonuclear devices, if such lines could be implanted at greater depths than now commonly used.

One of the objects of this invention is the laying of communication cables whose conduits can follow a circuitous path.

It is an object of this invention to provide a device able to dig and embed a flexible, tubular member along a straight or circuitous path, at or below the surface of the ground so as to avoid drilling through hard, geological materials and other obstructions.

It is another object of this invention to permit the substitution of a wire or cable of larger diameter than that used to power the controllable drilling mechanism which creates the subterranean opening.

The essential concept of the present invention is the generation of a simulated peristaltic action within a non-biological device.

It is a further object of the invention to provide improvements in the electrical gopher, described in our copending application, Ser. No. 444,879 filed Apr. 1, 1965.

In the device of the above noted application, a series of casings, secured successively to each other by universal joints, follow a drill through the bore made by the drill, the casing following in train-like succession and housing the means for operating the drill and providing for its direction control. This device is particularly adaptable to the laying of electric cable of such small diameter that it can be carried in one of the casings of the train and extruded therefrom.

Numerous boring and drilling techniques are available for drilling and boring holes through the earth. These techniques all create openings whose cross-sectional area is much greater than the present cross-sectional area of communications cable and other such small diameter tubular members. Present day communications cables and flexible pipes are often of very small diameter. For example, a specially designed submarine cable one sixteenth of an inch in diameter exists which is able to withstand thousands of pounds of pressure and yet transmit megacycles of electrical signal bandwidth provided that suitable spaced repeater amplifiers are built into the cable. Currently, if such a cable were to be laid horizontally several hundred feet below the ground surface and for distances greater than a few hundred feet, a huge tunnel —often six or more feet in diameter—would have to be excavated. Thus, using present techniques, it is often necessary to drill or bore holes whose cross-sectional area is millions of times greater than the cable or tube to be laid. The primary objection to tunnelling is the high cost of such an operation. Tunnels cost in the order of hundreds of dollars per linear foot.

The proposed invention seeks to reduce appreciably the cost of drilling holes for communications lines and other utilities requiring the introducing of conduits and/or pipes through the subterranean environment.

While to date the drills created by man cannot drill long circuitous holes, other animals further down the philogenetic scale such as the worm, the mole, and the gopher fare better. The fundamental difference is that the biological digging machines have more intelligence at the drill head than man's drills. A gopher, for example, doesn't attempt to chew through rock like man's drill. Thus, an object of this invention is to allow a drilling mechanism to exhibit intelligent behavior.

The present invention provides means for self-propelling long, flexible conduits at the rear of a controlled drilling mechanism, which can be similar to the electrical gopher of the copending application referred to above. The drilling mechanism is used to drill a hole, and a mechanism is provided for advancing a long tubular member through the hole by peristaltic action, much like that used by earthworms and snakes to propel themselves from one place to another. A large cable may be carried inside the tube or dragged behind it.

Further objects will be evident to one skilled in the art from a study of the specific description which follows, and the drawings appended hereto.

In the drawings:

FIG. 1A is a schematic fragmentary view of one form of a complete drilling and cable laying assembly;

FIG. 1B is a cross-section taken substantially on the line 1B—1B of FIG. 1A;

FIG. 1C is a longtitudinal section taken substantially on the line 1C—1C of FIG. 1B;

FIGS. 2A and 2B are cross-sectional views of a plastic tube, showing the contour change which takes place when fluid under pressure is introduced;

FIGS. 3A and 3B are cross-sectional views of a plastic tube of elliptical cross-section, and illustrate the change in contour which takes place when water or fluid under pressure is introduced;

FIG. 4 is a cross-sectional view of a set of tubes such as are shown in FIG. 3A, elliptical in cross-section and uninflated;

FIGS. 5A, 5B and 5C are schematic cross-sectional views of a set of tubes illustrating the peristaltic motion caused by a progressive selection of every fourth tube for inflation;

FIG. 6 is a schematic representation of a thin-walled plastic tube around which are fixed a set of four peristaltic wave producing tubes;

FIG. 7 is a perspective fragmentary view of the tube arrangement of FIG. 6, showing end couplings;

FIG. 7A is a fragmentary longitudinal sectional view of an end coupling arranged to direct drilling fluid to a drill head;

FIGS. 8A, 8B and 8C are fragmentary views partly in cross-sections of an intestine-like thin-walled plastic tube illustrating an included body moved forward by motion which simulates peristaltic action;

FIG. 9 is a perspective view of a coupling member used to connect adjacent sections of the device;

FIG. 10A is a perspective view of a motor for operating a commutating valve, and the shielding for the valve;

FIG. 10B is an exploded view of the elements of the commutating valve;

FIG. 11 is a fragmentary and schematic longitudinal section illustrating the direction of water flow in the drilling device; and FIGS. 12A, 12B, 12C and 12D show a modification of the invention wherein the small tubes which provide the peristaltic action are carried by molded material which may also carry electric wiring.

Referring more in detail to the drawing, FIGS. 1A, 1B and 1C show an exemplary embodiment of the invention. A drill head 10 has attached thereto a series of rigid cylindrical sections, 12, 14 and 16 which are secured to each other by universal connections 13 of any standard type to enable them to follow the drill 10 through bores of devious configuration. The forward section 12 houses a motor 18 and other devices necessary for operating the drill bit or head 10. Housed in these sections may be the driving and orienting equipment described in our copending application above referred to, wherein motors are controlled from aboveground to change the angular setting of the drill head. Fluid used to produce sphincter action, later described, may also be used as drilling fluid. In this event, provision must be made for the incoming and returning fluid, plus drillings to by-pass the centrally located motor 18. Ducts 22 and 24 are provided for this purpose. Thus, the fresh fluid supply from the several ducts merge and pass to the drill head 10.

Trailing from the rearward housing 16 is a flexible conduit unit 20 whose length corresponds to the length of the bore to be made. In this embodiment of the invention, as shown in FIG. 1A, the cable 26 to be laid is carried within the conduit 20, and may be used in the interval of installation to provide power for the motor 18.

The drill bit 10 grinds through the earth and the peristaltic tube 20 advances along at approximately the same speed as the drill head. As power is applied to the drill via electrical cables 26, and as there are no high mechanical dragging forces on these cables, it is possible to apply power to the drill head even though the direction of the drill head may be changing to avoid hard obstructions, such as rocks or other hard material 28.

Although there are many ways of visualizing peristalsis, it may be sufficient for the present purpose to imagine wrapping the fingers of a hand around a plastic tube and moving the hand along the length of the tube. There are the familiar examples of the peristaltic action of the esophagus and the small intestine in man. In both of these cases the wave is transmitted by a relaxation of the sphincter muscles ahead of the advancing mass, and sphincter contraction behind the mass. This action is known as Starling's Law. The essential concept of the present invention is the generation of a simulated peristaltic action within a non-biological device. This is accomplished by winding around a thin-walled plastic tube a set of smaller tubes which relax and contract like a sphincter muscle. The manner in which this sphincter-like expansion and contraction sequentially occurs and travels is shown in FIGS. 2A, 2B, 3A, 3B, 4, 5A, 5B and 5C.

FIG. 2A shows a cross-section of a plastic tube 20, and FIG. 2B shows the same tube filled with water or other fluid under pressure. As would be expected, the diameter of the plastic tube increases as a result of internal pressure.

If the tube is elliptical in cross-section, the contour change which takes place when fluid under pressure is introduced will involve not only its diameter, but the shape of the tube as well. Note: FIGS. 3A and 3B.

The progression of a peristaltic wave motion from left to right in the direction of the arrows, is illustrated in FIGS. 4, 5A, 5B and 5C. A set of elliptical tubular elements are shown in cross-section placed side by side. In FIG. 6 a set of four such small flexible tubes are laid parallel and wound around a thin-walled flexible tube or conduit 30 so that each small tube assumes a substantially circumferential position capable of sphincter-like relaxation and contraction.

In FIGS. 5A, 5B and 5C a condition has been introduced of pressurizing every fourth tube intermittently and in sequence. In FIG. 5A, the first tube of a set of four has been subjected to sufficient pressure to effect change in contour.

In FIG. 5B the first tube has been relieved of internal pressure and has regained its original contour, fluid under pressure being now applied to the second tube of the set. In like manner, fluid under pressure may be applied in sequence to tube 3, tube 4 and then to tube 1 again. It will be understood that the choice of four tubes is exemplary. The invention may be applied to a unit of more or less than four.

Each small tube is connected to its individual pressure source, and when the pressure is supplied rhythmically as described, a wave is created that will progress along the entire length of a unit, such as is shown in FIG. 6. If such an assembly were laid on the ground, peristaltic action would occur akin to that produced by a moving snake, and the assembly would move across the ground in snake-like fashion.

FIGS. 8A, 8B and 8C are a representation of a thin-walled, intestine-like plastic tube 32 constructed of a series of ridges 34 advancing through a bore in the earth by virtue of the fact that portions of the outer casing can be made to expand and relax to produce a rhythmic or wave-like motion in the exterior surface of the casing. The wave-like motion simulating peristalsis and produced by contraction and relaxation of sphincter-like elements, travels along the surface of the casing, moving an included body from right to left, as indicated by arrows, and reacting with the walls of the bore to produce a forward movement of the entire assembly.

The small plastic tubes 1, 2, 3 and 4, which provide the traveling ridges described above, begin and terminate in coupling members, such as are shown at 36 in FIGS. 1A, 7, 9, 10B and 12D. This coupling provides, first of all, connection of the small tube set to a commutating valve, such as is shown in FIG. 10, and will be described later. When the whole unit is segmented, this coupling 36 is used to connect the segments and provide continuity for fluid flow. The coupling 36 may also be used, as shown in FIG. 1A, to carry fluid under pressure from tubes 1, 2, 3 and 4 through shielding 37 to the drill head where it functions also as drilling fluid.

As will now be seen, the small tubes 1, 2, 3 and 4 and the fluid traveling through them to provide the traveling wave 34, thus have a double function.

The end of each tube 1, 2, 3 and 4 is attached into an individual channel 1', 2', 3' and 4' provided therefor in the coupling 36. See FIG. 10B. Each channel 1', 2', 3', and 4', after accommodating the terminal portion of a small tube has a right angularly directed portion which terminates in an opening in the end portion of the coupling (see A, B, C and D in FIGS. 7, 9, 10B and 12D), and communicates with nozzles A', B', C', and D', respectively.

Fluid from a fluid pressure source, see inlet 38, is distributed by a commutating valve 40 (see FIGS. 10A and 10B) to each small tube 1, 2, 3 and 4 intermittently and in sequence through the coupling element 36 which connects to the floor portion 42 of the valve 40. The floor portion 42 is provided with openings and attached nozzles A', B', C' and D'. Each nozzle A', B', C', and D' is shown to flare outwardly toward the valve body circumference, and each is provided with a valve seat.

A duct 44 is located in a second portion 46 of the valve body 40 and provides communication between the pressure inlet 38 and a conduit 48. The conduit 48 is journaled in the member 44 and is rotatable by means of a motor driven shaft 50. The conduit 48 has an S- or crank configuration, and is provided with a terminal opening such that in its rotating motion it contacts each of the opening seats on A', B', C', and D', establishing communication intermittently and in sequence with each, and thereby inflating each tube 1, 2, 3 and 4 rhythmically as described above.

The assembled valve unit with a motor 52 and shielding 54 is shown in FIG. 10A.

The flow from the sphincter tubes 1, 2, 3 and 4 in the direction of the drill head and its return through the main tube 30 is illustrated in FIG. 11.

Various methods have been contrived for constructing and assembling the main tube 30 and the sphincter tubes 1, 2, 3 and 4. In FIGS. 12A, 12B, 12C and 12D, the four expandable plastic tubes 1, 2, 3 and 4 are moulded in a plastic mouldable material 56. The mould may also carry conductors 58. In FIG. 12C, the set of sphincter-like tubes 1", 2", 3" and 4" are bonded to the main tube 30". It is thus possible to construct the device with a sufficiently thick wall so that it is adequate for use with conventional cable laying machinery.

It is important that the variation of velocity and pressure along the expanse of tube be kept as small as possible. Some of the variation in velocity and pressure will arise from production variations in moulding of the units that make up the assembly.

Some of this variation in water pressure and velocity can be corrected by reverse coupling of sections in such a way that tube 1 in one section feeds to tube 4 in the next, tube 2 feeds to tube 3, and so on. Variations can thus be averaged out. Each small tube also can be choked as desired by any expedient means, such as screws 5, 6, 7 and 8 (see FIG. 9 which operates as choke valves).

Finally, assemblies can be built where the sphincter-like tubes are built inside a plastic tube. The assembly can be laid in a subterranean environment and a heavy cable can later be drawn through it.

Although the invention has been described with reference to several embodiments, it will be understood to those skilled in the art that the invention is capable of a variety of alternative embodiments within the spirit and scope of the appended claims and particularly, although four small tubes are shown, the invention is not limited to this number.

We claim:

1. In a device for producing peristaltic wave motion in the peripheral wall of a flexible main tube by means of intermittent introduction of fluid under pressure to a set of small flexible tubes wound closely about the periphery of said main tube, a valve interposed between said set of small tubes and a source of fluid under pressure, said valve comprising a valve body, an end member on said valve body, a set of valve seats eccentrically located in said end member, each valve seat providing a conduit for one of said small tubes to the interior of said valve body, a second end member, a drive shaft centrally located in said second end member, an inlet from said fluid source in said second end member, a conduit member of crank-shaft formation adapted for communication with said inlet, a drive shaft for rotating said conduit member, means on said conduit member for contacting intermittently each of said valve seats to produce intermittent and sequential communication between said fluid pressure source and each of said small flexible tubes.

2. In combination with a device for producing peristaltic motion, a valve body, a plurality of flexible conduit members, a plurality of valve seats located in circular formation on a floor of said valve body, each conduit member terminating in one of said valve seats, a fluid pressure inlet in said valve body, a crank-shaped conduit communicating with said inlet, means for rotating said crank-shaped conduit about one end thereof as an axis and means on the distal end of said crank-shaped conduit for intermittent and sequential contact with each of said valve seats for supplying fluid under pressure to each of said flexible conduit members intermittently and sequentially.

3. A device for subterranean laying of cable, said device comprising: a drill head, casing elements having universal joint connection and capable of carrying means for operating and directing said drill head connected to said drill head and following said drill head through the subterranean tunnel made thereby in train-like fashion, a flexible tube connected to the rearward casing in said train and following said train, means connected to the outer periphery of the wall of said flexible tube for providing peristaltic action in said wall to move said flexible tube within the tunnel made by said drill.

4. In a device for creating simulated peristaltic movement, a main flexible tube, a set comprising a plurality of flexible tubes, encircling said main flexible tube, a coupling element, individual conduit means in said coupling element communicating with each one of said flexible tubes, a commutating valve for commutating fluid under pressure from a pressure source to each of said flexible tubes in said set sequentially, moving conduit means in said valve for establishing communication intermittently and sequentially between a source of pressure and each of said flexible tubes.

5. A device for producing simulated peristaltic movement in the wall of a main flexible conduit member, said device comprising: a source of fluid under pressure, a plurality of individual flexible tubes in a set forming a winding about said main flexible tube, a coupling, a valve body, an individual conduit in said coupling for each of said flexible tubes, each of said individual conduits communicating with a valve seat member, a plurality of valve seat members located on an end portion of said valve body and interiorly of said valve body, a conduit member communicating with a pressure source, said conduit member having a section of crank configuration and moveable to contact each of said valve seats intermittently and in rhythmic sequence to establish communication intermittently and in rhythmic sequence between said fluid pressure source and each of said flexible tubes.

6. In a device for producing subterranean bores, a drill head, casings attached to said drill head and adapted to follow said drill head in train-like manner through a subterranean bore made by said device, a flexible tube secured to the rearward one of said housings and following said housings through said bore, means for producing a wave-like motion simulating peristaltic movement in the wall of said flexible tube to propel said tube along said bore, a motor for operating said drill located in one of said casings, conduits in said housing for carrying drilling fluid past said motor to said drill, and conduits for withdrawing drilling fluid and drillings.

7. In a device for producing subterranean bores, a drill head, a flexible tube for providing withdrawal of drilling fluid and drillings, means for producing a wave-like motion in the wall of said flexible tube for propelling said tube forward, said means comprising also a plurality of conduits for supplying drilling fluid to said drill head.

8. A device for subterranean laying of cable, said device comprising a drill head capable of drilling a subterranean bore, a flexible tube attached to said drill head and following said drill head through the bore made thereby, said flexible tube capable of carrying drilling fluid to said drill head and capable also of accommodating a cable to be laid, and means for producing in the wall of said flexible tube a wave-like motion simulating peristaltic movement for moving said device forward.

9. A device for drilling of subterranean bores, said device comprising a thin-walled main plastic tube, a set comprising a plurality of small plastic tubes wound closely about the periphery of said main tube, drilling fluid under pressure introduced sequentially and intermittently into each small plastic tube for achieving a wave-like motion simulating peristaltic motion in said main tube and for conducting drilling fluid to a drilling area, said main tube conducting drilling fluid and drillings away from a drilling area.

10. In a device for producing wave-like motion simulating peristalsis, reversible units, each unit comprising: a segment of thin-walled flexible conduit, a plurality of small flexible tubes laid parallel to each other and wound circumferentially about said flexible conduit, each tube being individually flexed when subjected to fluid pressure, an end coupling on one end of said flexible conduit, a plurality of channels in said coupling, each channel receiving an end of a small flexible tube, and terminating in an opening in an end of said coupling, an identical coupling attached to the remaining end of said flexible tube, the openings being so located in the ends of said couplings that the channels and openings of one coupling mate with the openings and channels of another unit so that uninterrupted communication is established from the set of small tubes in one unit to the small tubes in another unit placed in juxtaposition therewith.

References Cited

UNITED STATES PATENTS

| | | | |
|---|---|---|---|
| 2,271,005 | 1/1942 | Grebe | 175—61 |
| 3,110,922 | 11/1963 | Senne | 15—323 X |
| 3,140,666 | 7/1964 | Currie | 103—149 |

FOREIGN PATENTS

| | | |
|---|---|---|
| 74,136 | 1/1954 | Holland. |
| 735,749 | 8/1955 | Great Britain. |

CHARLES E. O'CONNELL, *Primary Examiner.*

N. C. BYERS, *Assistant Examiner.*